US010147995B2

United States Patent
Daton-Lovett (10) Patent No.: US 10,147,995 B2
(45) Date of Patent: Dec. 4, 2018

(54) ANTENNA ASSEMBLY AND RELATED METHODS

(71) Applicant: RTL Materials Ltd., Lymington Hampshire (GB)

(72) Inventor: Andrew James Daton-Lovett, Lymington (GB)

(73) Assignee: RTL Materials Ltd., Lymington Hampshire (GB)

( * ) Notice: Subject to any disclaimer, the term of this patent is extended or adjusted under 35 U.S.C. 154(b) by 175 days.

(21) Appl. No.: 14/917,633

(22) PCT Filed: Nov. 1, 2013

(86) PCT No.: PCT/GB2013/052867
§ 371 (c)(1),
(2) Date: Mar. 9, 2016

(87) PCT Pub. No.: WO2015/033085
PCT Pub. Date: Dec. 3, 2015

(65) Prior Publication Data
US 2016/0226126 A1 Aug. 4, 2016

(30) Foreign Application Priority Data
Sep. 9, 2013 (GB) .................................. 1316018.9

(51) Int. Cl.
*H01Q 1/40* (2006.01)
*H01Q 1/08* (2006.01)
(Continued)

(52) U.S. Cl.
CPC ............. *H01Q 1/087* (2013.01); *E04H 12/34* (2013.01); *F16L 7/00* (2013.01); *F16M 11/04* (2013.01);
(Continued)

(58) Field of Classification Search
CPC ..... H01P 3/02; H01P 3/06; H01P 3/00; H01B 11/18; H01B 11/00; H01Q 1/08
See application file for complete search history.

(56) References Cited

U.S. PATENT DOCUMENTS 3,331,075 A 7/1967 Moulton
3,524,190 A 8/1970 Killion et al.
(Continued)

FOREIGN PATENT DOCUMENTS

DE 2437098 2/1976
GB 586591 6/1941
(Continued)

OTHER PUBLICATIONS

International Search Report dated May 22, 2014 in corresponding International Patent Application No. PCT/GB2013/052867.
(Continued)

*Primary Examiner* — Graham Smith
*Assistant Examiner* — Noel Maldonado
(74) *Attorney, Agent, or Firm* — Pepper Hamilton LLP (57) ABSTRACT

An antenna assembly and related methods are described. The antenna assembly (1) comprises an extendible mast (2) constructed and arranged so as to be configurable between a coiled form and an extended form. The extended mast (2) is resiliently biased in the form of an elongate tube having a slit along its length. The coiled mast is wound about an axis extending transversely to the longitudinal extent of the mast. An antenna (6) is integrally coupled to the mast such that when extended, the mast supports and positions the antenna, and when coiled, the mast and antenna are coiled together.

15 Claims, 8 Drawing Sheets

(51) Int. Cl.
*H01Q 1/20* (2006.01)
*E04H 12/34* (2006.01)
*F16L 7/00* (2006.01)
*F16M 11/04* (2006.01)
*F16M 11/40* (2006.01)
*H01Q 1/36* (2006.01)
*E04C 3/00* (2006.01)

(52) U.S. Cl.
CPC ............... *F16M 11/40* (2013.01); *H01Q 1/20* (2013.01); *H01Q 1/36* (2013.01); *H01Q 1/40* (2013.01); *E04C 3/005* (2013.01)

(56) References Cited

U.S. PATENT DOCUMENTS

| | | | |
|---|---|---|---|
| 3,541,568 A | 11/1970 | Lowenhar | |
| 3,978,489 A | 8/1976 | Kurland et al. | |
| 4,117,495 A | 9/1978 | Hochstein | |
| 4,225,871 A * | 9/1980 | Ramari | H01Q 1/087 343/877 |
| 4,265,690 A | 5/1981 | Lowenhar | |
| 6,064,346 A * | 5/2000 | Blom | H01Q 1/242 343/749 |
| 6,256,938 B1 * | 7/2001 | Daton-Lovett | F16H 19/064 138/119 |

FOREIGN PATENT DOCUMENTS

| | | |
|---|---|---|
| JP | S57181206 A | 11/1982 |
| WO | 88/08620 | 11/1988 |
| WO | 97/35706 | 10/1997 |
| WO | 98/13895 | 4/1998 |
| WO | 99/62811 | 12/1999 |
| WO | 99/62812 | 12/1999 |
| WO | 2012/168741 A1 | 12/2012 |

OTHER PUBLICATIONS

British Search Report dated Feb. 17, 2014 in corresponding British Patent Application No. GB1316018.9.
RTL Materials Ltd., "Rolatube Technology Technical Briefing," Sep. 3, 2012, pp. 1-13.

* cited by examiner

ANTENNA ASSEMBLY AND RELATED METHODS

This application is a national phase filing under 35 U.S.C. § 371 of International Patent Application No. PCT/GB2013/052867, filed Nov. 1, 2013, which claims the benefit of British Patent Application No. 1316018.9, filed Sep. 9, 2013, each of which is incorporated herein by reference in its entirety.

The present invention relates to an antenna assembly, a method of manufacturing an antenna assembly, a method of deploying an antenna assembly and a method of stowing an antenna assembly.

Slit tubular structures, generically known as STEMs, have been used since the 1950's as an alternative to telescopic or jointed devices to provide for extendable members from a small initial envelope. They consist of longitudinally slit tubes, which can be opened along the slit line and coiled for compact storage or driven between the coiled and extended forms to provide a driven arm, mast or boom.

Simple slit metal tubes are mainly used in spacecraft and other areas where compact size was the main imperative, as they are awkward to handle and have a very low torsional stiffness. For any application other than that in which a simple coil of spring metal is released for a single-shot use, they require relatively large and heavy constraining structures, negating many of the advantages of the basic device.

In the 1990's, devices commonly referred to as bi-stable reeled composites (BRCs), as described in WO97/35706 came into general use. These manage the problems of difficult handling and complicated mechanism by forming STEM type structures from materials that have been engineered so as to make them easy to coil and handle, in particular many of them exhibit a stable geometry in both the extended and coiled states.

These bi-stable tubes have been in use as antenna supports since the early 2000's. Large numbers are used in current theatres of operations by the UK, US and other armed forces, as they offer the means to transport antenna masts in much smaller spaces than telescopes, jointed or articulated rods or tubes. This allows, for example, a five metre mast used with the UK Armed Forces "Bowman" communications system to be carried in a rucksack side-pouch, rather than as a one point two metre long bag of sectional glass fibre tubes that was the previous standard for this system. Their simplicity and absence of joints also means they are much less likely to fail in the field, where sticking joints or local damage to telescope sections commonly cause failure as a result of alternating hot and cold weather conditions or relatively minor impact incidents.

Whilst these masts provide for more reliable and far more compact means of elevating an antenna to improve performance, the antennas themselves are largely those in use on the previous generation of masts and can be cumbersome, sometimes taking up significantly more space in carriage and weighing more than the new generation BRC mast used to support them.

According to a first aspect of the present invention, there is provided an antenna assembly, comprising:

an extendible mast constructed and arranged so as to be configurable between a coiled form and an extended form, wherein when extended the mast is resiliently biased in the form of an elongate tube having a slit along its length and wherein when coiled the mast is wound about an axis extending transversely to the longitudinal extent of the mast; and, an antenna integrally coupled to the mast such that when extended, the mast supports and positions the antenna, and when coiled, the mast and antenna are coiled together.

Thus, the antenna assembly provides an extendible mast with an integral antenna which advantageously allows the antenna and the mast to be coiled and extended together, greatly simplifying the deployment, storage and transportation of such devices. The antenna assembly can be stored and transported in its coiled form, and then deployed by simply extending the mast such that the antenna is positioned for receiving/transmitting signals. In prior art schemes for deploying antennas in the field, the antenna would be a standard antenna, not designed for use with any particular mast, which would be transported separately from the mast and then fixed to the distal end the mast at the point where the mast is to be erected. Such prior art schemes are clearly cumbersome and problematic compared with the present invention.

The antenna assembly can in principle be operated with a wide variety of antenna types and different sizes of mast according to need. The mast is preferably made from a relatively thin material or materials to aid coiling, e.g. between 1 mm and 5 mm. The antenna element or elements comprising the antenna are preferably also thin, e.g. no more than 2 mm, so as not to significantly affect the ability of the mast to coil. Thus, the antenna can be entirely contained within the footprint of the mast without significantly adding bulk to the overall assembly.

In embodiments, the antenna is formed from one or more antenna elements. The or each antenna element may have a significant extent in the longitudinal direction of the mast, e.g. greater than 5 cm, or greater than 20 cm, or greater than 50 cm in some instances.

In some embodiments, the antenna can extend substantially all of the extent of the mast. In other embodiments, the antenna is distanced from the bottom of the mast, by for example at least a quarter, or a half, or three quarters of the longitudinal extend of the mast, so as to be elevated when the antenna assembly is erected.

The mast can progressively extend from being coiled to its slit tube form. Thus, in embodiments, the mast can be completely or partially extended when deployed, as desired.

In an embodiment, the antenna is not provided by any structural component of the mast, e.g. material that completely or significantly provides the axial stiffness or bending stiffness needed to keep the mast erected, or the hoop modulus needed to provide the resiliency when in the slit tube form, and generally resist the stresses and strains acting on the mast when deployed and supporting the antenna. Thus, the antenna is not constrained to extending the entire length of the mast. The antenna and the mast may also be formed from different materials.

In an embodiment, the antenna is bonded to a surface of the mast. Any suitable adhesive or bonding technique can be used according to the materials used for the antenna and mast.

In an embodiment, the antenna is bonded within a structural component of the mast. Thus, the antenna is integrated within the mast within the material of the mast which is contributing to the structural properties of the mast.

In an embodiment, a structural component of the mast comprises a conductive material, the assembly comprising an insulating layer disposed between the conductive element and the antenna. This allows conductive materials to be used without affecting the antenna in operation.

In an embodiment, the antenna comprises a woven material, braid or perforated material to accommodate strains induced in the antenna when the mast is coiled. In embodiments where the antenna is bonded to the surface or near the surface of the mast, the use of these materials for the antenna helps avoid delamination or damage to the assembly due to the strains involved in coiling and extending the mast.

In an embodiment, the antenna is positioned at the neutral axis of bending of the mast. This provides another technique for bonding the antenna to the mast to help avoid delamination or damage to the assembly due to the strains involved in coiling and extending the mast.

In an embodiment, the mast comprises a pocket that receives the antenna such that the antenna can slip relative to the mast. In order words, the antenna is loosely attached to the mast so that there can be relative movement between the two to accommodate strains when the mast is coiled and extended. The pocket may for example be formed by the mast comprising a sheet or sheets of material on the front or rear surface of the rest of the mast attached at different circumferential positions so as to form a space behind it, i.e. the pocket. The sheet or sheets may make no significant contribution to the structural requirements of the mast. Thus, the sheets can be thin which helps avoid any conflict with the rest of the mast being able to coil and extend.

In an embodiment, the mast comprises a reinforced composite. Thus, the mast can be made from layers of fibre reinforced polymer or the like. In an embodiment, the mast comprises a bistable material. It is anticipated that these materials will be preferred materials for forming the mast in many applications.

In an embodiment, a structural component of the mast comprises a conductive material, wherein the component also serves as the antenna. For example, the mast may be made from a fibre reinforced composite structure, wherein a layer of composite reinforcement is conductive. For example, one or more layers can be formed from glass fibres and one or more other layers can be formed of carbon fibre, which is conductive and which can serve as the antenna.

In an embodiment, the antenna assembly comprises a connector on the mast for connecting the antenna assembly to a communications system. Where the antenna is entirely enclosed within the material of the mast, a hole in the mast or wires protruding through the mast may be provided to access and connect to the antenna.

In an embodiment, the connector is positioned on the mast at a distance from the antenna, the assembly comprising a cable integrally coupled to the mast along a portion of the mast to connect the antenna and connector, the mast and cable are coiled together.

In an embodiment, the antenna assembly comprises a pocket at a side edge of the mast in which the cable is retained. Due to the slit tube form of the mast, two side edges are formed running the longitudinal extend of the mast, either or both of which can be provided with a pocket formed in the material of the mast or from additional material bonded or fixed to the mast. In the coiled configuration, the mast is flattened out at the slit in the tube so that the side edges are at the sides of the coil. Thus, the cable in the pocket is coiled with the mast at the sides of the coil such that it lies outside the footprint of the mast, i.e. it is not in the interstitial spaces of the coiled mast, meaning that the coiling of the cable does not interfere with the coiling of the mast.

In an embodiment, the antenna assembly comprises a housing for containing the coiled mast and guiding the mast as it is extended. The housing may have has a winding mechanism for coiling or extending the mast, or both. Thus, the antenna assembly may be extended and retracted manually, allowed to self extend by the release of a mechanism constraining the coiled assembly, extended from containers designed to hold the coiled device or mechanised to allow deployment by hand cranking or by means of a powered system. Use may be made of any of the above means in providing specific embodiments of the current invention.

According to a second aspect of the present invention, there is provided a method of manufacturing an antenna assembly, comprising:

integrally coupling an antenna to an extendible mast, the mast being constructed and arranged so as to be configurable between a coiled form and an extended form, wherein when extended the mast is resiliently biased in the form of an elongate tube having a slit along its length and wherein when coiled the mast is wound about an axis extending transversely to the longitudinal extent of the mast, such that when extended, the mast supports and positions the antenna, and when coiled, the mast and antenna are coiled together.

According to a third aspect of the present invention, there is provided a method of deploying an antenna assembly, the antenna assembly comprising:

an extendible mast constructed and arranged so as to be configurable between a coiled form and an extended form, wherein when extended the mast is resiliently biased in the form of an elongate tube having a slit along its length and wherein when coiled the mast is wound about an axis extending transversely to the longitudinal extent of the mast; and, an antenna integrally coupled to the mast such that when extended, the mast supports and positions the antenna, and when coiled, the mast and antenna are coiled together, the method comprising positioning and extending the mast from the coiled form to the extended form so as to elevate the antenna.

According to a fourth aspect of the present invention, there is provided an antenna assembly comprising:

an extendible mast constructed and arranged so as to be configurable between a coiled form and an extended form, wherein when extended the mast is resiliently biased in the form of an elongate tube having a slit along its length and wherein when coiled the mast is wound about an axis extending transversely to the longitudinal extent of the mast; and, an antenna integrally coupled to the mast such that when extended, the mast supports and positions the antenna, and when coiled, the mast and antenna are coiled together, the method comprising coiling the mast from the extended form In embodiments, any of the methods described above is used with an antenna assembly according to any example or embodiment described herein.

It will be appreciated that any features expressed herein as being provided "in one example" or as being "preferable" or an embodiment may be provided in combination with any one or more other such features together with any one or more of the aspects of the present invention.

Embodiments of the present invention will now be described by way of example with reference to the accompanying drawings, in which.

Figure 1:
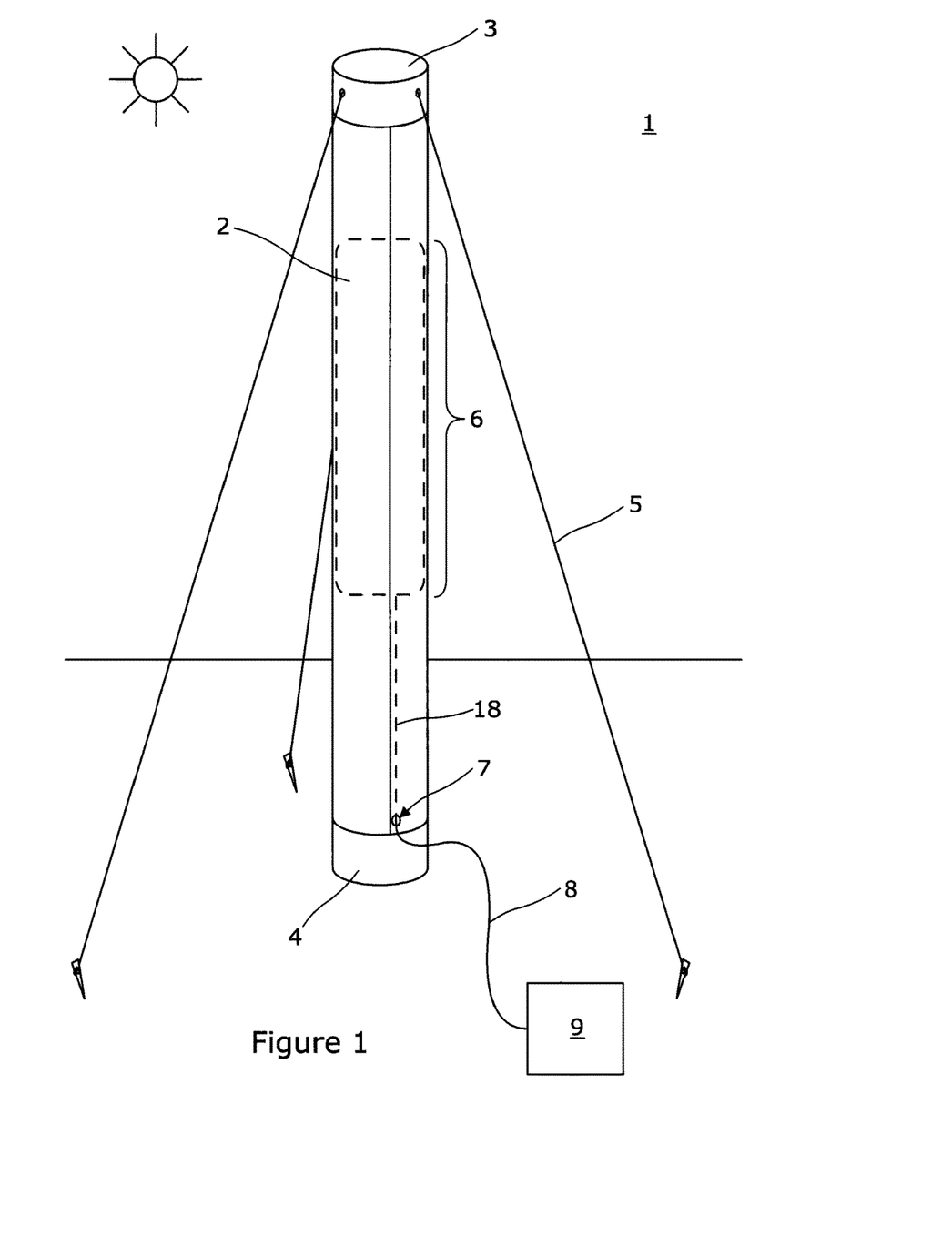
FIG. 1 shows a perspective view of an example of an antenna assembly according to an embodiment of the present invention.

FIG. 1 shows an example of an antenna assembly 1. The assembly 1 comprises an extendible mast 2 incorporating an integral antenna 6 formed from one or more antenna elements along some or all of its length (shown in broken line in the example of FIG. 1). References made herein to the longitudinal or axial direction of the mast 2 or antenna assembly generally refer to the direction in which the mast is extended. The mast 6 has a top cap 3 and a bottom cap 4 which attach to the ends of the mast. Optionally, tethers 5 are attached the top of the mast or to the top cap 3 and are pinned to the ground to help anchor the antenna assembly 1 in place. Alternatively, the assembly 1 can be self supporting.

The antenna assembly 1 has a connector 7 by which connection can be made at a convenient point to the antenna assembly 1 by a cable 8, e.g. a co-axial cable, for connecting the antenna assembly 1 to a communication system 9. Where the connector 7 is at some distance from the antenna 6, the mast may include a cable 18 to connect the two.

The extendible mast 2 has the form of a STEM (slit tubular extendible member). Thus, as shown in more detail in FIG. 2, the mast 2 is formed of an elongate member of sheet-like material, i.e. the member is thin in cross section, e.g. typically between 1 mm and 5 mm. The member can be opened out into a flat form allowing it to be wound into a coil 11. The extended portion 12 is resiliently biased to have a cross section that is curved, in this example, in the form of a circle or partial circle. Thus when fully extended, the member is resiliently biased in the form of a slit tube. The sides of the tube may meet or overlap to form a full tube, or a gap may be left. Cross sections other than circular may be used. For example, ovals and other continuous, non-circular arcs for the cross section can also be produced. The cross section may have straight portions between curved portions whilst being generally curved. The antenna is integral with the extendible mast so as to be able to coil and uncoil with the mast 2. Various techniques for doing this are described in the following disclosure.

Figure 2:
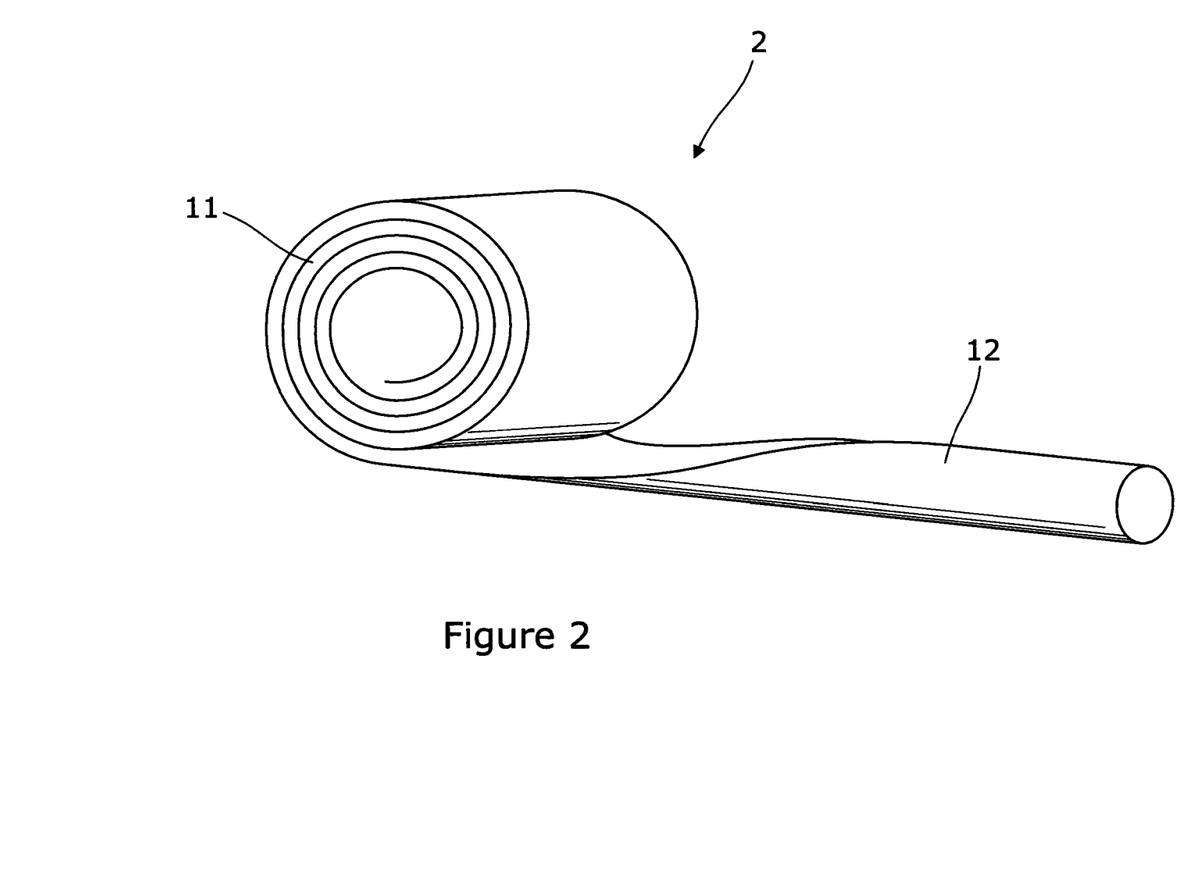
FIG. 2 shows a perspective view of an example of an extendible mast suitable for use with the antenna assembly of FIG. 1.

Thus, with the end cap 3 and bottom cap 4 removed, the antenna assembly 1 can be progressively wound/unwound around an axis perpendicular to its longitudinal extent between a fully coiled form and a fully extended form. If desired, a housing can be provided to contain the coiled antenna assembly and to help guide the extension of the mast.

The techniques described herein allow the production of STEM type masts 2 that integrate the antenna function with that of the coil-able mast 2, reducing pack size and often weight and greatly simplifying the deployment of communications antennas. Whilst the techniques could allow the production of integral mast and antenna systems using any mast 2 that falls into the general category of a STEM, provided the material base used for the mast 2 is not such as to interfere with the RF requirements of the antenna 6, it is anticipated that implementation will in many cases use composites, Fibre Reinforced Plastics (or Polymers) (FRPs) or Bistable Reelable Composite type devices, as their characteristics are well suited to this type of use. Other material, such as polymers with good elastic properties or metals may be used but in general FRP produce a product of superior performance.

FRPs are known per se and are not described in detail herein. However, in brief, FRPs are composite materials made of a polymer matrix reinforced with fibres. The fibres are usually fiberglass, carbon, or aramid, while the polymer is usually an epoxy, vinylester or polyester thermosetting plastic or thermoplastic, such as polypropylene, polyethylene nylon or poly-ether-ether-ketone. Although the use of thermosetting resins has formed the traditional basis for FRP manufacture, thermoplastic matrix polymers are increasingly being used, due to their speed of production and often superior mechanical performance. The use of fibrous materials mechanically enhances the strength and elasticity of the plastics. The original plastic material without fibre reinforcement is known as the matrix. The matrix is a tough but relatively weak plastic that is reinforced by stronger stiffer reinforcing filaments or fibres. The extent that strength and elasticity are enhanced in a fibre reinforced plastic depends on the mechanical properties of both the fibre and the matrix, their volume relative to one another, and the fibre length and orientation within the matrix. Often FRPs are manufactured by consolidating or laminating different layers of material together. As described below, this layering technique can be used to integrally couple the antenna to the mast by placing the antenna within the laminate.

In one example, the material used for the mast 2 is a BRC comprising bistable member, whether made of FRP or otherwise. Such a bistable member has a first stable state in the coiled form, wherein the cross section of the member is generally flat and a second stable state in the extended form, wherein the cross section of the member is curved as previously described. Preferably, the bistable member is capable of reversible configuration between its coiled and extended forms a plurality of times. Suitable structures are disclosed in the following international patent applications, each of which is incorporated here by reference: WO-A-88/08620, WO-A-97/35706, WO-A-99/62811, and WO-A-99/62812. Such bistable structures are available from RolaTube Technology Limited of Lymington, United Kingdom.

As described in the above-referenced patent applications, such a bistable member generally comprises material that creates a bias towards configuring the material in the extended form (e.g. having a circular cross-section in this example), as well as material that creates a bias opposite to the first bias (e.g. one that biases the member towards its flattened, retracted or coiled form). The member can comprise a resilient substrate, made of metal for example, which is biased toward the extended form (e.g. biased toward making the member have a circular cross-section), laminated with a plastic layer that tends to bias the member towards the retracted form (e.g. having a flattened cross-section). Alternatively, the member can comprise a strip or sheet of a thermoplastic material having prestressing means attached thereto or embedded therein. One particular example is a thermoplastic strip having prestressed fibres therein (such as fibres of glass, carbon, or polymeric materials). The fibres can be located at different angles relative to each other in the plane of the coiled member, such as comprising one set of fibres that are longitudinally extending and a second set of fibres that are transversely extending. Such fibres-reinforced composite members (e.g. a thermoplastic resin, such as polyethylene or polypropylene, with fibres of another material, such as glass, carbon, or aramid, embedded therein) are preferred for use in the present invention.

It is clear that a mast 2 made from a simple metal or otherwise conductive STEM could itself, in fact, be used as a form of antenna as well as contributing to the required structural characteristics of the mast. This does not, however, lend itself to use in most modern communications systems. This is primarily because of the need to tailor the length of the antenna 6 independently of the height to which it is desirable to raise the functional antenna. The division into sections of most high gain antennas, the use of balancing electronic circuits that need to be placed close to junctions in antenna elements and the other requirements of efficient RF design all mean this simple approach is of use only in a small number of circumstances. A high frequency, the 2 to 4 GHz bands of modern cellular communications for example, antenna may only be a few centimetres across but good reception may require this to be several metres in the air.

Thus, in most cases it is expected that the mast 2 and antenna 6 will comprise respectively dissimilar material. In order to combine the functions of antenna 6 and mast 2 in a single assembly 1 it is clear from the discussion above that the dissimilar materials will need to be combined in such a manner that the antenna 6 is not adversely affected by the repeated coiling and uncoiling of the STEM mast 2.

Figure 3:
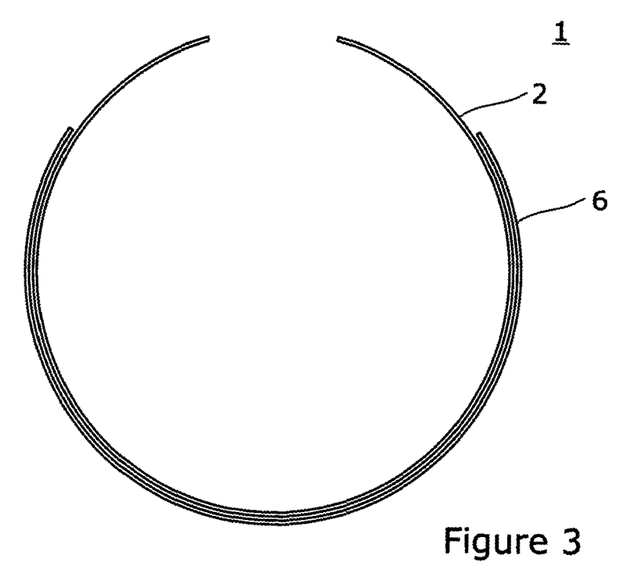
FIG. 3 shows in cross section an example of an antenna assembly.
Figure 4:
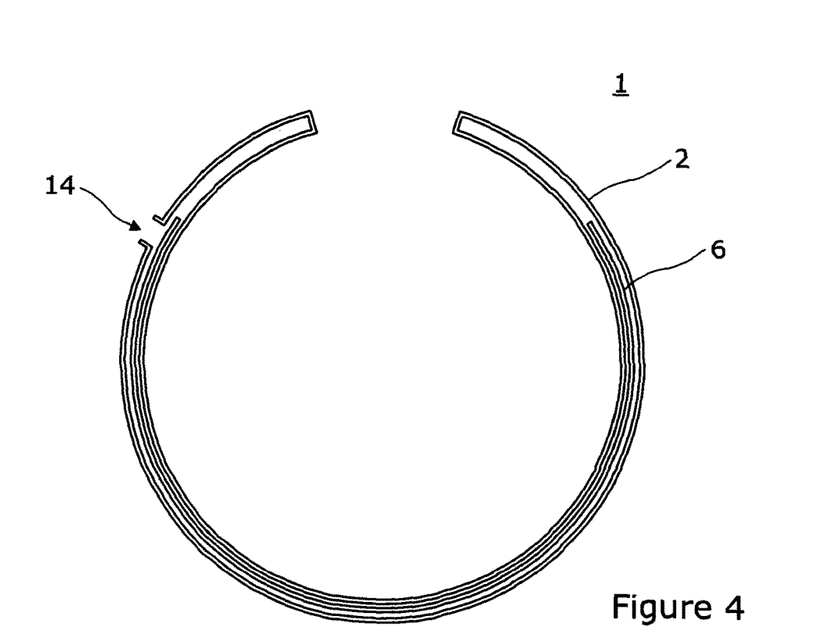
FIG. 4 shows in cross section another example of an antenna assembly.

If the antenna 6 is small, for example the 2 to 4 GHz type described above, this can be achieved by either bonding a simple conductive foil antenna to the mast 2 (as shown by FIG. 3), or by embedding the conductive element within the lamina of a composite (e.g. FRC or BRC) mast (as shown by FIG. 4).

If the antenna element 6 is fully embedded, then provision either of a conductive wire or other element that runs through to the surface to allow connection, or of a hole or cavity 14 (as shown in FIG. 4) in the structure of the STEM 2 must be made to allow connection of the antenna 6 to the external communications apparatus 9.

Figure 5:
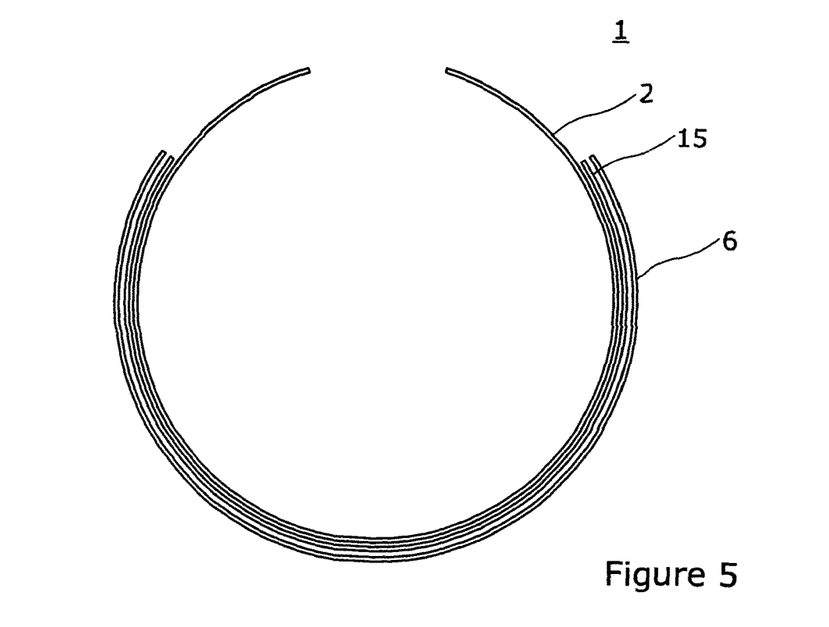
FIG. 5 shows in cross section yet another example of an antenna assembly.

If the material of the STEM is conductive, an insulating layer 15 must be placed to act as a barrier between the STEM 2 and the antenna element 6 or elements, as shown in FIG. 5.

In the case of longer antenna elements, the same general techniques as shown in FIGS. 3 to 5 can be used, with now the additional issue of incorporating the antenna 2 to the mast 2 in such a manner as to prevent the action of coiling the antenna assembly 1 causing it to be damaged. This can be achieved for example in the ways summarised as follows:

By attaching the antenna 6 in such a manner as to allow it to slip relative to the material of the mast 2, thus isolating it from the strains occurring at the surface of the mast 2 during coiling and extension By forming the antenna 6 from a material that is capable of tolerating repeated cycles of extension and retraction By positioning the antenna 6 on or close to the neutral axis of bending of the mast 2, such that the strain it experiences when coiled and extended is minimal In the case of an antenna 6 that is loosely coupled, allowing slip relative to the STEM mast 2, any material that is suitable from an electrical point of view may be used to form the antenna 6 provided its nature is such that it does not interfere with the coiling of the STEM mast 2. In practice this means that it will usually be formed of a thin material, metallic films, metal coated polymer films, woven or braided wire cloths or other conductive polymer or fabric materials are amongst the materials that could be used successfully. Whilst there will in most cases be a requirement for some thicker elements in the form of ferrite chokes and balun transformers, or some electronic circuits that need to be sited close to the antenna feed point, these need to be localised, such as to form a small, local discontinuity in the coiled profile of the STEM, such as not to interfere with its coiling. Where an electrical requirement may exist for a component with a physical size and shape such that it cannot be rolled interstitially with the STEM, the option exists to site it on the edge of the STEM.

Figure 6:
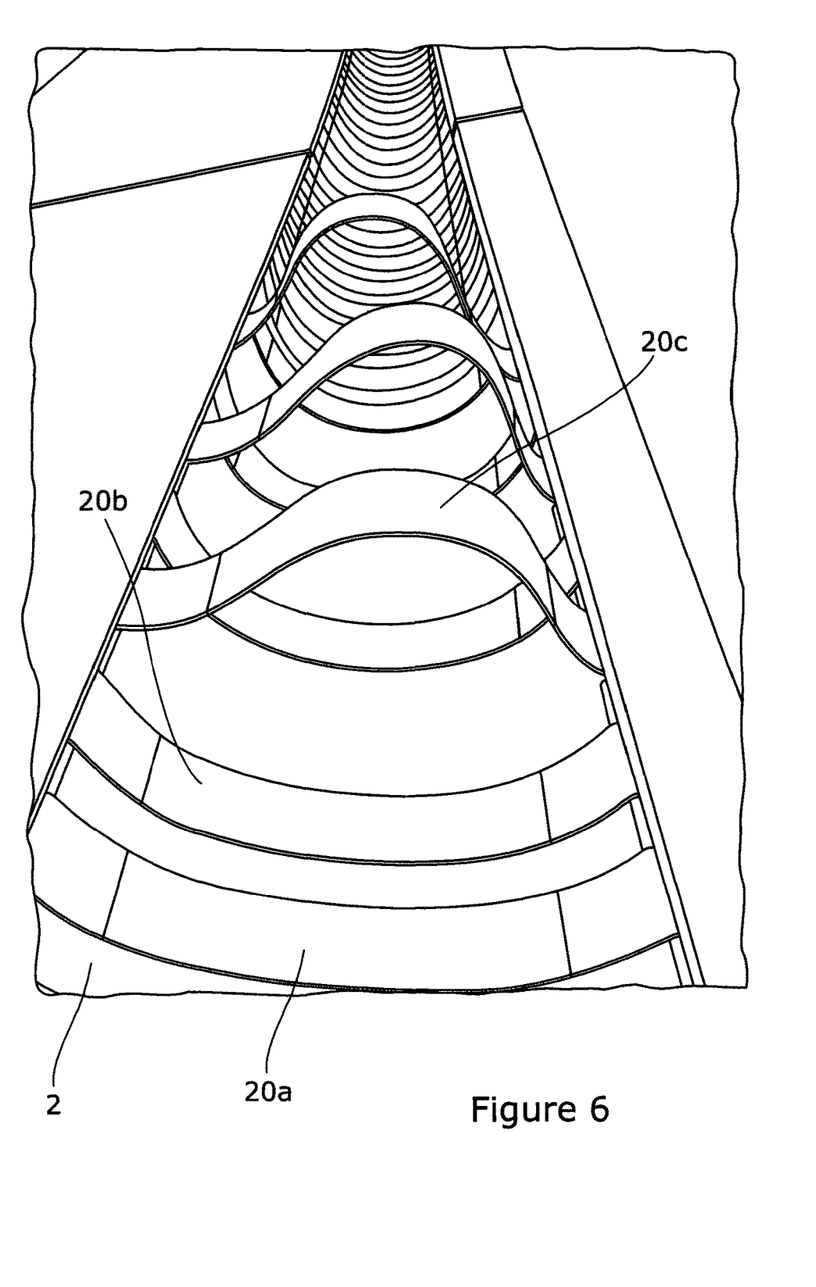
FIG. 6 shows a perspective view of an example of an antenna assembly in the extended configuration.
Figure 7:
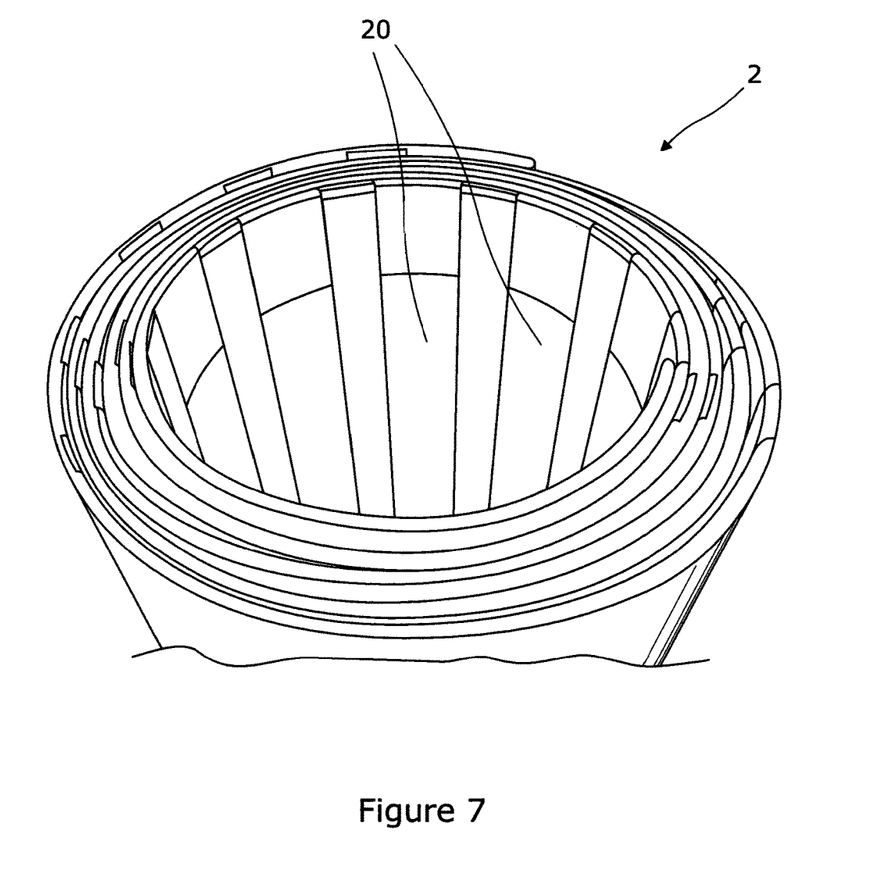
FIG. 7 shows a perspective view of the antenna assembly of FIG. 6 in the coiled configuration.

FIG. 6 shows an example where the inner surface of the STEM 2 has a plurality of "slats" 20a,20b,20c . . . at intervals along its length. Each slat 20a,20b,20c is attached at its ends to at two points across the STEM 2 such that a pocket is formed behind the slats 20a,20b,20c. Some of the slats, such as slat 20c, are shown in FIG. 6 in a position where they are raised from the inner face of the STEM 2 to illustrate this. The antenna 6 can be positioned within this pocket created by the slats 20. To ensure the antenna 6 does not slip cumulatively over cycles of extension and retraction, one end of the antenna 6 can be secured to the mast 2. It may be desirable to attach the other end to the mast 2 with an extensible elastic coupling in order to prevent buckling of the antenna 6 and ensure smooth extension and retraction. In this way the antenna 6 will be held under tension against the fixed attachment of the other end. Thus, the antenna 6 can be integrally included with the mast 2 in such a way that the mast 2 can be coiled (as shown in FIG. 7) with the antenna 6 in the interstitial spaces between the coils and extended (as shown in FIG. 6).

From a production and use point of view, the technique of allowing slip between the antenna 6 and the structure of the mast 2 creates some additional challenges. Separating the antenna 6 mechanically from the body of the STEM, although it is possible to provide some sort of loose cover within which it is protected from the external environment but made as, for example, a covering layer on the STEM that has an un-bonded area to act as a pocket within which the antenna sits, can lead to a device with more potential points of failure and the sliding action has the potential to cause wear on both the antenna and the STEM. For this reason, other techniques where the antenna 6 is bonded to the mast 2, as described below, may be preferred in some implementations.

If the antenna element or elements 6 are to be bonded to the surface of the STEM or to a part of the STEM that is at a significant distance from the neutral axis, then the choice of material needs to be such that the extension and coiling of the STEM will not degrade its performance. In practice this means using a material that is highly extensible along the principle axes of the STEM. Simple metal foils or metallised polymer films tend to perform poorly in this context. Not only is the bonding of them to most, fibre reinforced polymer based STEM structures in current use in this context difficult but they respond poorly to cyclic strain. The simplest solution to this problem is to use antenna elements formed from woven or braided conductive fabrics, in which the fibre angle lies at a significant angle relative to the principle axis of the STEM. This functions to provide a viable practical solution in two ways:

The open texture of the material allows the polymer base of the STEM, either during production of during a post fixing operation, to be continuous through the open weave or braid. This ensures good mechanical fixing, even if the adhesion of the materials is not sufficiently good for a straightforward adhesive bond to take the repeated cyclic strains of operation.

The woven or braided structure exhibits a very high Poisson's ratio. Thus when the STEM is coiled, the extension along the axis causes the fibres to move relative to each other in the manner of a lattice fence, the extension along the long axis causing shortening along the hoop axis in sympathy with the surface strains of the STEM as it is coiled. On extension, this is reversed. The effect is to reduce the strain on the individual conductive fibres to a very low level. Characteristically in a BRC type STEM the axial surface strains will be of the order of 2%. The fibre strains in a fabric with angles of 45 degrees to the axis in its weave will be reduced to between about 0.15% to 0.3%, a level comfortably within the tolerance for cyclic strain of most conductive materials. This can be manipulated by varying the fibre angle allowing some compensation for variations in the mast structure and the characteristics of the antenna material. In practice most bi-stable structures are made with fibre angles in the surface layers lying between plus and minus 30 degrees to the long axis of the structure, this will also tend to be the case for woven or braided antenna elements.

This Poisson ratio effect in surface layers is exploited in BRC type STEMs to produce their fundamental characteristics of an engineered level of bi-stability and coherent extension and coiling. If used on a BRC STEM, the conductive fabric is therefore operating in sympathy with the underlying structure and therefore the shear strains of the antenna relative to the underlying STEM are reduced to close to zero, further improving the bond integrity and minimising the likelihood of failure in operation.

If the antenna elements 6 are to be fully embedded within the structure of the material of the underlying STEM as a discrete layer or lamina, then provided they are located close to the neutral axis of bending of the STEM the cyclic strain is greatly reduced and the antenna material can be chosen without particular concern as to this aspect of its performance. Any material, when bent, will experience extension on the extrados face and compression on the intrados face. It therefore follows that at some point within the material plane a level will experience neither extension nor compression, this is known as the neutral axis of bending. For a homogeneous, orthotropic material the neutral axis will lie at or close to the central plane of the material normal to the major and minor axes of bending. Although for non-orthotropic materials, such as laminar composites, the location of this point of zero axial strain may translate slightly from the central plane during bending, locating a material that is relatively inextensible at this point within the material of the mast will minimise the strains experienced by it during bending.

The bonding of the antenna material to that of the STEM mast 2 does, however, become critical when included within the structure of the STEM mast 2.

If the antenna elements 6 are to be placed as discreet layers forming part of what, regardless of the nature of the STEM will, by definition become a laminar structure consisting of insulating structural elements either side of the conductive antenna. This means the bonding of the lamina has to be such as to reduce any potential impact of local shear forces to the point where de-bonding does not occur.

This can be addressed by:

Using a woven or braided or perforated conductive material for the antenna 6, in much the same manner as described above, with the exception that the angles of the fibres in the weave or braid are no longer critical to the cyclic strain placed on the conductive fibres. Where a perforated material is used, it may be advantageous for the perforations to be arranged in such a manner that the continuous lines that can be drawn between perforations lie along angles other than the major and minor axes of bending, thus reducing the continuous strain applied to the material.

Using a material for the antenna 6 that is compatible with the material of the STEM 2, such that a good enough adhesive bond is obtained during manufacture—certain epoxy resins, for example, may produce a good enough bond to a metal that a STEM formed from an epoxy matrix composite can tolerate the inclusion of a metal or other conductive layer within its structure Forming the antenna 6 as an integral part of the fibre reinforcement of a fibre reinforced composite structure. The technology exists to form a layer of composite reinforcement such that parts of its area may, for example, be formed from glass and others of carbon fibre, which is conductive. In this manner a pre-formed sheet of reinforcing material could be manufactured that has the pattern of the antenna present within it as a change in the nature of the fibre reinforcement in some areas of its structure. This can then be processed to form a composite STEM in any of the ways known to a practitioner of the art.

In most cases, the antenna 6 will terminate electrically some distance from either end of the supporting STEM mast 2. Although electrical connection can be made to a separate cable 8 at the feed point of the antenna 6, it is clearly desirable to be able to make this connection at some point convenient to the user. To this end, a cable may be embodied in the STEM mast 2 to connect the antenna 2 to the connector 7.

Figure 8:
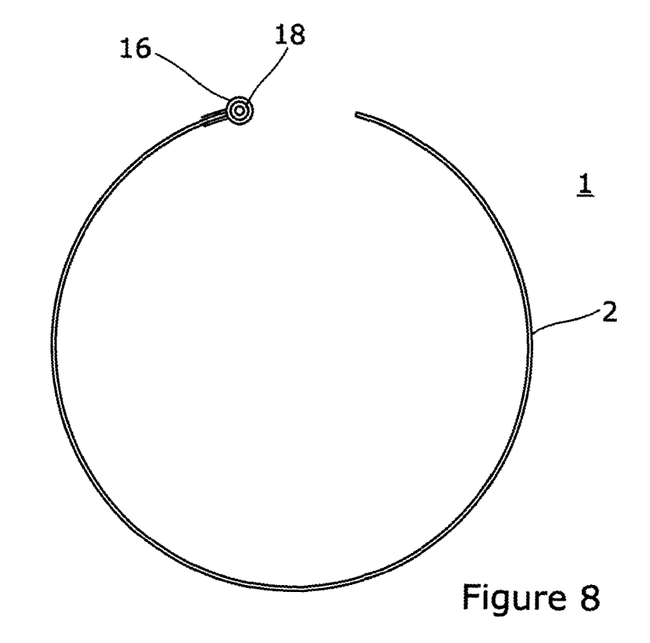
FIG. 8 shows in cross section still another example of an antenna assembly.

FIG. 8 shows one way of accomplishing this by running the cable 18 within a pocket 16 along the edge of the STEM mast 2. This is particularly well suited to use with co-axial cables or others that require a significant diameter in order to function. By positioning the cable 2 at the edge, any increase in the overall thickness of the structure can be eliminated or kept to a minimum, so its affect on the ability of the mast 2 to coil is minimised. In contrast, if the cable was positioned on the face of the mast, the whole structure will distort during coiling as one part of it is separated by the additional cable gap and other parts are not. It would then be necessary to increase the thickness of the STEM elsewhere to compensate, leading to a large, unmanageable coil.

Alternatively, connection to the antenna 6 can be accomplished by one or more thin conductive elements bonded to the surface of the STEM mast 2 running along its length. Alternatively, connection to the antenna 6 can be accomplished by one or more thin conductive elements can be embedded within the material of the STEM mast 2 running along its length.

In practice the choice will be related to the nature of the antenna element 6. If this requires a co-axial feed, then it will usually prove preferable to run a co-axial cable 18 in a pocket 16 along the long edge, as shown in FIG. 8. If there is no need for a co-axial feed, then if the antenna element 6 is bonded to the surface of the STEM mast 2, it may prove more straightforward to bond the conductors to the surface. Similarly, if the antenna 6 is embedded within the structure of the STEM mast 2, it may prove more straightforward to also embed the conductive elements leading to the connection point 7 within the structure of the STEM mast 2.

The techniques described herein allow the production of STEM type masts 2 that integrate the antenna function with that of the coil-able mast 2, reducing pack size and often weight and greatly simplifying the deployment of communications antennas. As illustration, an example of an antenna assembly made according to the principles disclosed herein has a mast that is 5 meters high having a 7.5 cm diameter, with an elevated dipole antenna element the bottom of which is located 2.5 m from the bottom of the mast. This antenna assembly 1 is capable of coiling into a cylindrical space 18 cm in diameter and 25 cm high, and weighs about 4 kg.

Figure 9:
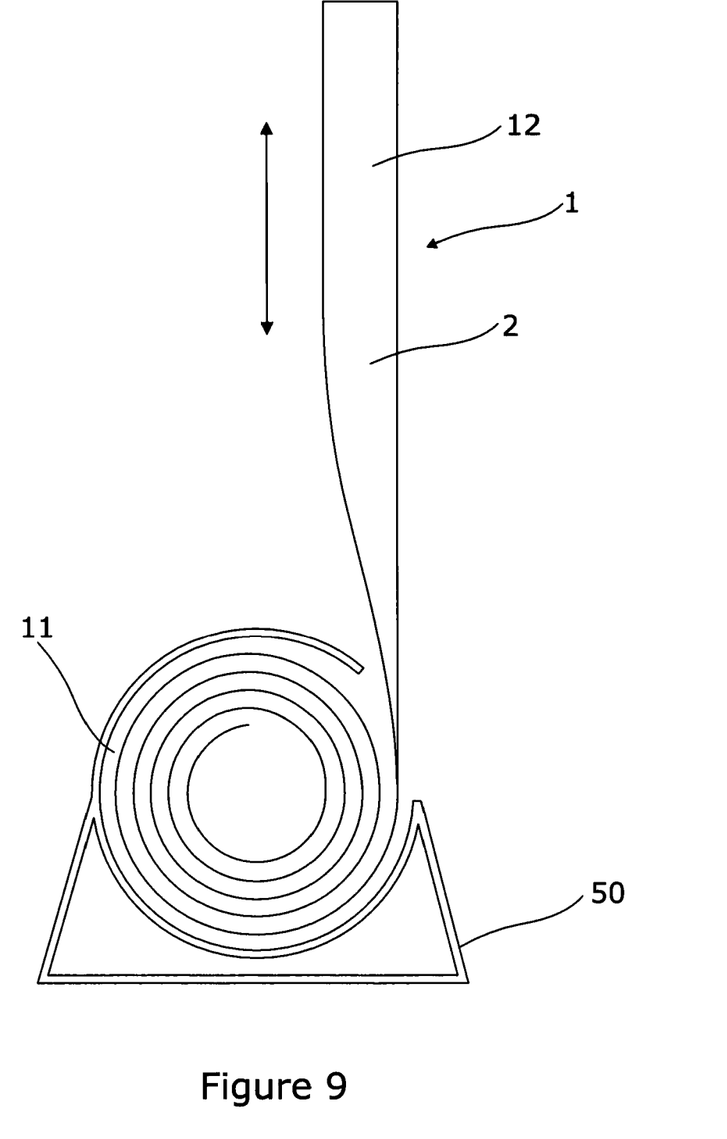
FIG. 9 shows in cross section a housing for dispensing an antenna assembly; and, FIG. 10 shows in cross section another housing for dispensing an antenna assembly.
Figure 10:
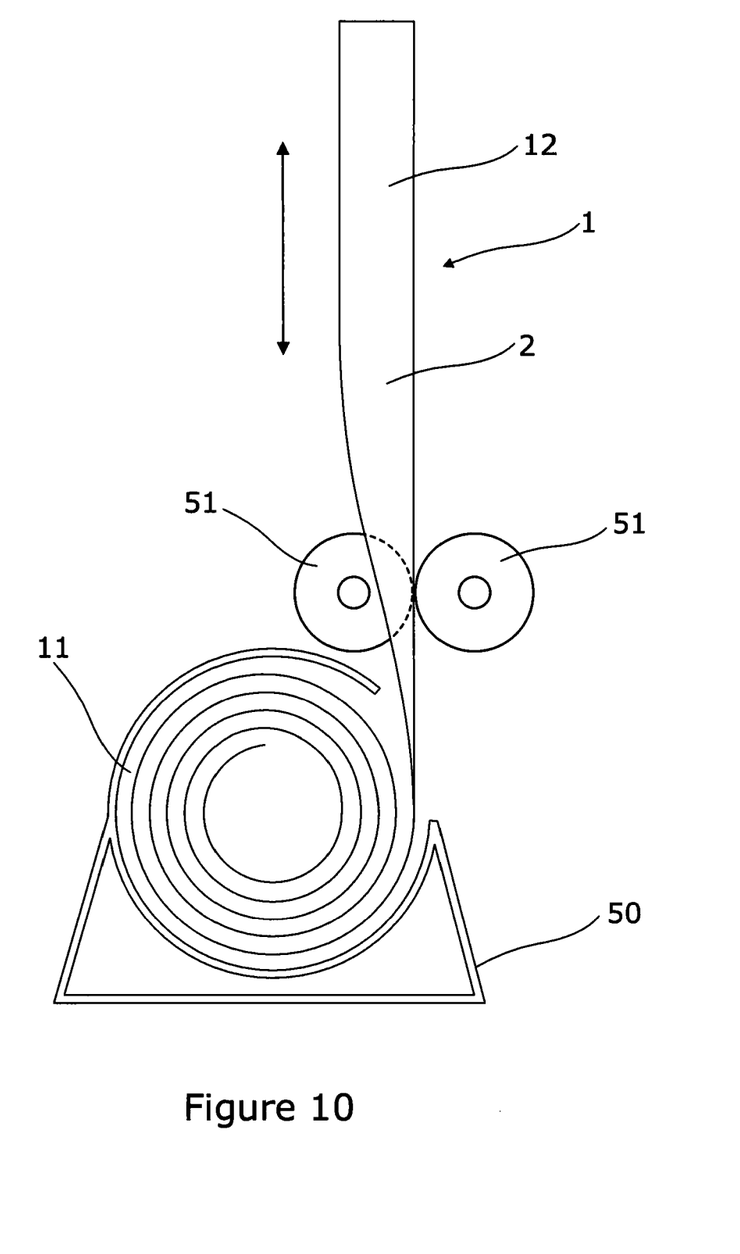

The assembly 1 may be provided with a housing 50 which contains the coiled mast 2 from which it can be extended wholly or partially. The housing 50 may form a base for supporting the extended antenna assembly when deployed. FIG. 8 shows a housing 50 that provides a simple "push-pull" cassette, which holds the coil 11 in place and allows the mast 2 to be push-pull extended and retracted. The housing 50 may include a releasable mechanism that constrains the coiled portion 11 of the mast 2, such that releasing the mechanism allows the mast 2 to self coil. The housing 50 may include a hand-operated or motor driven mechanism for winding/extending the mast 2 that is arranged such as to drive the mast 2 between extended 12 and coiled 11 states. For example, FIG. 9 shows a housing 50 comprising a pinch-wheel 51 operable to drive the mast 2.

As will be appreciated many other means are available to provide the housing 50 and drive to the mast 2. The housing 50 may provide complete containment or be composed of rods or rollers arranged around the coil 11, closely enough spaced to prevent it going in between the rods or rollers when in use, but thus reducing friction on the surface of the coil.

Embodiments of the present invention have been described with particular reference to the example illustrated. However, it will be appreciated that variations and modifications may be made to the examples described within the scope of the present invention.

The invention claimed is:

1. An antenna assembly, comprising:
   an extendible mast constructed and arranged so as to be configurable between a coiled form and an extended form, wherein when extended the mast is resiliently biased in a form of an elongate tube having a slit along its length and wherein when coiled the mast is wound about an axis extending transversely to a longitudinal extent of the mast; and,
   an antenna integrally coupled to the mast such that when extended, the mast supports and positions the antenna, and when coiled, the mast and antenna are coiled together,
   wherein the mast comprises a laminate of insulating fibre-reinforced layers which provide structural rigidity to the antenna assembly, and
   wherein the antenna is electrically conductive and laminated with the insulating fibre-reinforced layers of the mast.

2. The antenna assembly according to claim 1, wherein the structural component of the mast comprises a conductive material, the assembly further comprising an insulating layer disposed between the conductive material and the antenna.

3. The antenna assembly according to claim 1, wherein the antenna comprises a woven material, braid or perforated material to accommodate strains induced in the antenna when the mast is coiled.

4. The antenna assembly according to claim 1, wherein the antenna is positioned at a neutral axis of bending of the mast.

5. An antenna assembly, comprising:
   an extendible mast constructed and arranged so as to be configurable between a coiled form and an extended form, wherein when extended the mast is resiliently biased in a form of an elongate tube having a slit along its length and wherein when coiled the mast is wound about an axis extending transversely to a longitudinal extent of the mast; and,
   an antenna integrally coupled to the mast such that when extended, the mast supports and positions the antenna, and when coiled, the mast and antenna are coiled together, wherein the mast further comprises a pocket that receives the antenna such that the antenna can slip relative to the mast when the mast is coiled or uncoiled.

6. The antenna assembly according to claim 1, wherein the mast comprises a reinforced composite.

7. The antenna assembly according to claim 1, wherein the mast comprises a bistable material.

8. The antenna assembly according to claim 1, wherein a structural component of the mast comprises a conductive material, wherein the structural component comprises the antenna.

9. The antenna assembly according to claim 1, further comprising a connector on the mast configured to connect the antenna assembly to a communications system.

10. The antenna assembly according to claim 9, wherein the connector is positioned on the mast at a distance from the antenna, the antenna assembly further comprising a cable integrally coupled to the mast along a portion of the mast to connect the antenna and connector, wherein the mast and cable are configured to be coiled together.

11. The antenna assembly according to claim 10, further comprising a pocket at a side edge of the mast in which the cable is retained.

12. The antenna assembly according to claim 1, further comprising a housing configured to contain the coiled mast and guiding the mast as it is extended.

13. The antenna assembly according to claim 12, wherein the housing comprises a winding mechanism for one or more of coiling and extending the mast.

14. A method of manufacturing an antenna assembly, comprising:
   integrally coupling an antenna to an extendible mast, the mast being constructed and arranged so as to be configurable between a coiled form and an extended form, wherein when extended the mast is resiliently biased in a form of an elongate tube having a slit along its length and wherein when coiled the mast is wound about an axis extending transversely to a longitudinal extent of the mast, such that when extended, the mast supports and positions the antenna, and when coiled, the mast and antenna are coiled together,
   wherein the mast comprises a laminate of insulating fibre-reinforced layers which provide structural rigidity to the antenna assembly, and
   wherein the antenna is electrically conductive and is coupled to the mast by laminating it with the insulating fibre-reinforced layers of the mast.

15. A method of using an antenna assembly, the antenna assembly comprising: an extendible mast constructed and arranged so as to be configurable between a coiled form and an extended form, wherein when extended the mast is resiliently biased in a form of an elongate tube having a slit along its length and wherein when coiled the mast is wound about an axis extending transversely to a longitudinal extent of the mast; and, an antenna integrally coupled to the mast such that when extended, the mast supports and positions the antenna, and when coiled, the mast and antenna are coiled together, wherein the mast comprises a laminate of insulating fibre-reinforced layers which provide structural rigidity to the antenna assembly and the antenna is electrically conductive and laminated with the insulating fibre-reinforced layers of the mast, the method comprising:

one or more of (i) positioning and extending the mast from the coiled form to the extended form so as to elevate the antenna and (ii) coiling the mast from the extended form.

* * * * *